(12) United States Patent
Kim

(10) Patent No.: US 9,064,205 B2
(45) Date of Patent: Jun. 23, 2015

(54) METHOD OF PRINTING DOCUMENT BASED ON BLACK OPTIMIZATION PRINTING OPTION AND IMAGE FORMING APPARATUS AND HOST DEVICE TO PERFORM THE SAME

(71) Applicant: Samsung Electronics Co., Ltd, Suwon-si, Gyeonggi-do (KR)

(72) Inventor: Young-ju Kim, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/052,178

(22) Filed: Oct. 11, 2013

(65) Prior Publication Data

US 2014/0078555 A1    Mar. 20, 2014

Related U.S. Application Data

(62) Division of application No. 12/869,162, filed on Aug. 26, 2010, now Pat. No. 8,576,453.

(30) Foreign Application Priority Data

Aug. 26, 2009    (KR) .................. 10-2009-0079479

(51) Int. Cl.
 *H04N 1/40* (2006.01)
 *G06K 15/02* (2006.01)
 *H04N 1/60* (2006.01)

(52) U.S. Cl.
 CPC .......... *G06K 15/1878* (2013.01); *H04N 1/6016* (2013.01); *H04N 1/6022* (2013.01)

(58) Field of Classification Search
 USPC ............... 358/3.24, 3.26, 2.1–3.02, 529, 1.9, 358/3.27; 382/162–167
 See application file for complete search history.

(56) References Cited

U.S. PATENT DOCUMENTS 6,058,207 A *  5/2000  Tuijn et al. .................... 382/162
7,506,584 B2 *  3/2009  Bestmann ..................... 101/483

(Continued)

FOREIGN PATENT DOCUMENTS

| JP | 07-111599 | 4/1995 |
| JP | 07-123267 | 5/1995 |

OTHER PUBLICATIONS

U.S. Office Action dated Mar. 21, 2013 from U.S. Appl. No. 12/869,162.

(Continued)

*Primary Examiner* — Barbara Reinier
(74) *Attorney, Agent, or Firm* — Staas & Halsey LLP

(57) ABSTRACT

A method of controlling an image forming apparatus supporting a black optimization printing option in a host apparatus includes executing a printer driver of the image forming apparatus, setting the black optimization printing option in a user interface of the executed printer driver, generating a second color matching table by using an existing first color matching table and color properties corresponding to red, blue, and green values of a document to be printed based on the set black optimization printing option, selecting a first printing method to print the document by using the first color matching table or a second printing method to print the document by using the second color matching table, based on the red, green, and blue values of the document, and transmitting the document and print data of the document to which a color matching table corresponding to the selected printing method is applied to the image forming apparatus.

12 Claims, 12 Drawing Sheets

| First Color-Matching Table /511 | | | | | | Second Color-Matching Table /521 | | | | |
|---|---|---|---|---|---|---|---|---|---|---|
| Pixel No. | C | M | Y | K | Average CMYColor Value | Region | Pixel No. | C | M | Y | K |
| 1 | 8 | 0 | 12 | 10 | 5 | 1 | 1 | 0 | 0 | 0 | 10 |
| 2 | 10 | 50 | 30 | 40 | 30 | 2 | 2 | 4 | 20 | 12 | 28 |
| 3 | 30 | 50 | 60 | 20 | 47 | 2 | 3 | 12 | 20 | 24 | 14 |
| 4 | 166 | 45 | 44 | 40 | 85 | 2 | 4 | 66 | 18 | 18 | 28 |
| 5 | 200 | 100 | 150 | 60 | 150 | 3 | 5 | 160 | 80 | 120 | 18 |

(56) References Cited

U.S. PATENT DOCUMENTS

| | | |
|---|---|---|
| 7,889,388 B2* | 2/2011 | Kaneko et al. ................. 358/1.9 |
| 8,643,908 B2* | 2/2014 | Hama et al. ................... 358/3.23 |
| 8,659,795 B2* | 2/2014 | Nakamura ..................... 358/1.9 |
| 2003/0072018 A1 | 4/2003 | Sasaki et al. |
| 2003/0210414 A1* | 11/2003 | Kuno ............................. 358/1.9 |
| 2005/0024661 A1 | 2/2005 | Akashi |
| 2012/0113441 A1* | 5/2012 | Hama et al. .................... 358/1.9 |

OTHER PUBLICATIONS

U.S. Notice of Allowance dated Jul. 5, 2013 from U.S. Appl. No. 12/869,162.

U.S. Appl. No. 12/869,162, filed Aug. 26, 2010, Young-ju Kim, Samsung Electronics Co., Ltd.

* cited by examiner

FIG. 5B

First Color-Matching Table ~511

| Pixel No. | C | M | Y | K | Average CMY Color Value | Region | Second Color-Matching Table ~521 | | | | |
|---|---|---|---|---|---|---|---|---|---|---|---|
| | | | | | | | Pixel No. | C | M | Y | K |
| 1 | 8 | 0 | 12 | 10 | 5 | 1 | 1 | 0 | 0 | 0 | 10 |
| 2 | 10 | 50 | 30 | 40 | 30 | 2 | 2 | 4 | 20 | 12 | 28 |
| 3 | 30 | 50 | 60 | 20 | 47 | 2 | 3 | 12 | 20 | 24 | 14 |
| 4 | 166 | 45 | 44 | 40 | 85 | 2 | 4 | 66 | 18 | 18 | 28 |
| 5 | 200 | 100 | 150 | 60 | 150 | 3 | 5 | 160 | 80 | 120 | 18 |

FIG. 5C

First Color-Matching Table / 511

| Pixel No. | C | M | Y | K | Highest CMY Color Value | Region |
|---|---|---|---|---|---|---|
| 1 | 8 | 0 | 12 | 10 | 12 | 1 |
| 2 | 10 | 50 | 30 | 40 | 50 | 2 |
| 3 | 30 | 50 | 60 | 20 | 60 | 2 |
| 4 | 166 | 45 | 44 | 40 | 166 | 3 |
| 5 | 200 | 100 | 150 | 60 | 200 | 3 |

Second Color-Matching Table / 531

| Pixel No. | C | M | Y | K |
|---|---|---|---|---|
| 1 | 0 | 0 | 0 | 10 |
| 2 | 4 | 20 | 12 | 28 |
| 3 | 12 | 20 | 24 | 14 |
| 4 | 133 | 36 | 35 | 12 |
| 5 | 160 | 80 | 120 | 18 |

FIG. 5D

First Color-Matching Table — 511

| Pixel No. | C | M | Y | K | Highest CMY Color Value minus K value | Region |
|---|---|---|---|---|---|---|
| 1 | 8 | 0 | 12 | 10 | 2 | 1 |
| 2 | 10 | 50 | 30 | 40 | 10 | 1 |
| 3 | 30 | 50 | 60 | 20 | 40 | 2 |
| 4 | 166 | 45 | 44 | 40 | 126 | 3 |
| 5 | 200 | 100 | 150 | 60 | 140 | 3 |

Second Color-Matching Table — 541

| Pixel No. | C | M | Y | K |
|---|---|---|---|---|
| 1 | 0 | 0 | 0 | 10 |
| 2 | 0 | 0 | 0 | 40 |
| 3 | 12 | 20 | 24 | 14 |
| 4 | 133 | 36 | 35 | 12 |
| 5 | 160 | 80 | 120 | 18 |

METHOD OF PRINTING DOCUMENT BASED ON BLACK OPTIMIZATION PRINTING OPTION AND IMAGE FORMING APPARATUS AND HOST DEVICE TO PERFORM THE SAME

CROSS-REFERENCE TO RELATED APPLICATIONS

This application is a Divisional Application of prior application Ser. No. 12/869,162, filed on Aug. 26, 2010 in the United States Patent and Trademark Office, which claims priority under 35 U.S.C. §119(a) of Korean Patent Application No. 10-2009-0079479, filed on Aug. 26, 2009, in the Korean Intellectual Property Office, the disclosure of which is incorporated herein in its entirety by reference.

BACKGROUND

1. Field of the Invention

The present general inventive concept relates to a method of printing a document based on a black optimization printing option and an image forming apparatus and a host device to perform the method.

2. Description of the Related Art

An image forming apparatus performs one or more of functions with respect to a document. Such functions include printing, copying, scanning, sending/receiving a fax, sending an e-mail, and sending a file to a server. When a user prints a document via an image forming apparatus, the user may set up a printing option, which is either a color printing option or a black/white (monochrome) printing option. The image forming apparatus performs color printing or black-and-white printing based on the set printing option. In the case where the color printing option is activated, if a portion of a document includes a color other than black, an image forming apparatus performs a printing task by combining cyan, magenta, yellow, and black.

SUMMARY

The present general inventive concept provides a method of printing a document based on a black optimization printing option and an image forming apparatus and a host device to perform the method. However, the present general inventive concept is not limited to the above features, and additional features and/or utilities may be achieved by a method, apparatus, and host device according to the present general inventive concept.

Additional features and utilities of the present general inventive concept will be set forth in part in the description which follows and, in part, will be obvious from the description, or may be learned by practice of the general inventive concept.

Features and/or utilities of the present general inventive concept may be realized by a method of controlling an image forming apparatus supporting a black optimization printing option in a host apparatus, the method including executing a printer driver of the image forming apparatus, setting the black optimization printing option in a user interface of the executed printer driver, generating a second color matching table by using an existing first color matching table and color properties corresponding to red, blue, and green values of a document to be printed based on the set black optimization printing option, selecting a first printing method to print the document by using the first color matching table or a second printing method to print the document by using the second color matching table, based on the red, green, and blue values of the document, and transmitting the document and print data of the document to which a color matching table corresponding to the selected printing method is applied to the image forming apparatus.

Features and/or utilities of the present general inventive concept may also be realized by a method of printing a document based on a black optimization printing option in an image forming apparatus connected to a host apparatus, the method including receiving the document and information regarding the black optimization printing option from the host apparatus, generating a second color matching table by using an existing first color matching table and color properties corresponding to red, blue, and green values of the document based on the received information regarding the black optimization printing option, selecting a first printing method to print the document by using the first color matching table or a second printing method to print the document by using the second color matching table based on values of red, green, and blue of the received document, and printing the document by using the first color matching table or the second color matching table according to the selected method.

Features and/or utilities of the present general inventive concept may also be realized by an image forming apparatus, which is connectable to a host apparatus and supports a black optimization printing option, the image forming apparatus including a communication interface unit to receive a document to be printed and information regarding the black optimization printing option from the host apparatus, a generating unit to generate a second color matching table by using an existing first color matching table and color properties corresponding to red, blue, and green values of the document based on the received information regarding the black optimization printing option, a control unit which controls the image forming apparatus such that print data to which either the first color matching table or the second color matching table is applied is printed by the image forming apparatus, a storage unit to store the received document and the generated second color matching table, a selecting unit to select a first printing method to print the document by using the first color matching table or a second printing method to print the document by using the second color matching table based on values of red, green, and blue of the received document, and an image forming unit to print the document by using the first color matching table or the second color matching table based on the selected method.

Features and/or utilities of the present general inventive concept may also be realized by a host apparatus to control an image forming apparatus supporting a black optimization printing option, the host apparatus including a user interface unit which receives information to set the black optimization printing option by using a printer driver of the image forming apparatus, a processor which executes the printer driver of the image forming apparatus, generates a second color matching table by using an existing first color matching table and color properties corresponding to red, blue, and green values of a document based on the selection of the black optimization printing option, and selects a first printing method to print the document by using the first color matching table or a second printing method to print the document by using the second color matching table, and a communication interface unit which transmits the document and print data of the document to which a color matching table corresponding to the selected printing method is applied to the image forming apparatus.

Features and/or utilities of the present general inventive concept may also be realized by a method of forming an image including generating a second color-matching table corresponding to a first color-matching table, the values of the second color-matching table based on values of a plurality of colors in a document and the values of the first color-matching table corresponding to predetermined levels of the colors divided into a predetermined number of intervals, each interval corresponding to an intensity of each color, respectively, and printing the document using the second color-matching table when the colors in the document are below a predetermined threshold.

Generating the second color-matching table may include assigning a weight to each of the values of the first color-matching table to correspond to the intensity of each color in the document, such that the values of the second color-matching table are the weighted values of the first color-matching table.

The predetermined threshold may include a plurality of thresholds, and generating the second color-matching table may include dividing the second color-matching table into a plurality of regions defined by the plurality of thresholds, respectively, the values of each region corresponding to a different weight than the values of each other region.

The weight may include a first weight value and a second weight value, the first weight value corresponds to a percentage applied to the values of the colors of the first color-matching table to generate the corresponding values of the colors of the second color-matching table, and the second weight value corresponds to a percentage applied to a value of at least one of the colors of the first color-matching table to generate a monochrome color value of the second color-matching table.

The first weight value may decrease as the values of the colors of the first color-matching table decrease, and the second weight value may increase as the values of the colors of the first color-matching table decrease.

The value of the at least one of the colors of the first color-matching table used to generate a monochrome color value of the second color-matching table may include an average of the values detected in the document of each color of the first color-matching table.

The monochrome color may be black.

The first color-matching table may include values of the colors red, green, and blue.

The first color-matching table may include values of the colors cyan, magenta, yellow, and black.

The method may include determining color intensities of a plurality of regions of the document, and printing each respective region of the document using the second color-matching table only when the colors in the respective region are below the predetermined threshold.

The method may include printing each respective region of the document using the first color-matching table only when the colors in the respective region are equal to or greater than the predetermined threshold.

Features and/or utilities of the present general inventive concept may also be realized by a method of printing an image including receiving an input to perform a monochrome-color optimization function on a document, generating a second color-matching table corresponding to a first color-matching table, the values of the second color-matching table based on values of a plurality of colors in the document and the values of the first color-matching table corresponding to predetermined levels of the colors divided into a predetermined number of intervals, each interval corresponding to an intensity of each color, respectively, determining whether the levels of the colors in the document exceed a predetermined threshold, and transmitting the second color-matching table with print data of the document only when the colors in the document do not exceed the predetermined threshold, and transmitting the first color-matching table with the print data of the document only when the colors in the document exceed the predetermined threshold.

Features and/or utilities of the present general inventive concept may also be realized by a method of printing an image including generating a second color-matching table corresponding to a first color-matching table, the values of the second color-matching table based on values of a plurality of colors in a document and the values of the first color-matching table corresponding to predetermined levels of the colors divided into a predetermined number of intervals, each interval corresponding to an intensity of each color, respectively, determining whether the levels of the colors in the document exceed a predetermined threshold, and printing the document using the second color-matching table only when the colors in the document do not exceed the predetermined threshold, and printing the document using the first color-matching table only when the colors in the document exceed the predetermined threshold.

BRIEF DESCRIPTION OF THE DRAWINGS

The above and other features and utilities of the present general inventive concept will become more apparent by describing in detail exemplary embodiments thereof with reference to the attached drawings in which:

FIGS. 5B through 5D illustrate conversions of a first color table to a second color table;

DETAILED DESCRIPTION OF THE EMBODIMENTS

Figure 1:
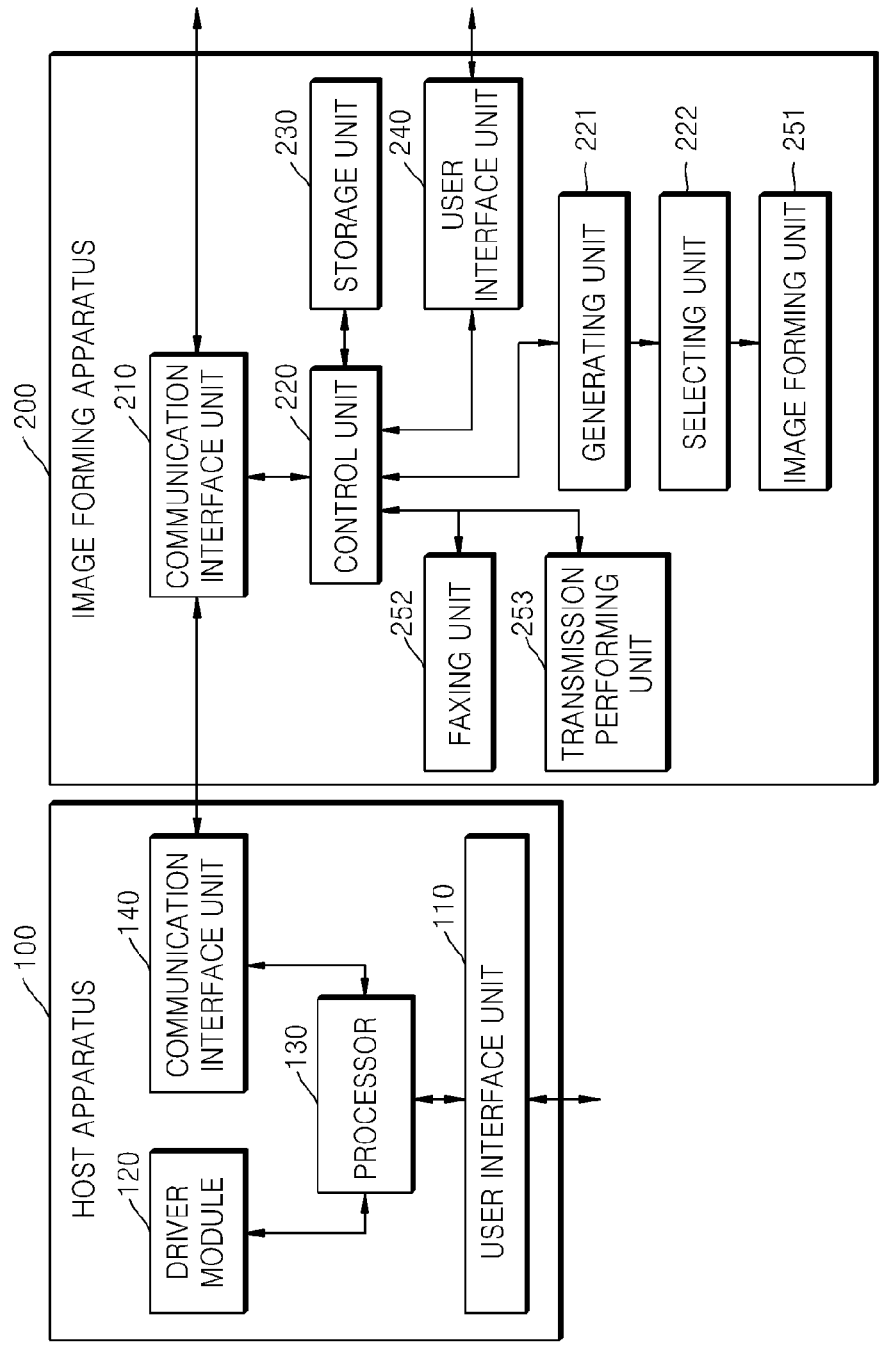
FIG. 1 is a schematic view of an image forming system according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a schematic view of an image forming system according to an embodiment of the present general inventive concept. Referring to FIG. 1, the image forming system according to an embodiment of the present general inventive concept includes a host apparatus 100 and an image forming apparatus 200. Although the image forming system according to an embodiment of the present general inventive concept includes only one host apparatus 100 and one image forming apparatus 200, the image forming apparatus 200 may be connected to a plurality of host apparatuses 100.

For clarity of the description, only components related to an embodiment of the present general inventive concept will be explained. Therefore, it will be understood by one of ordinary skill in the art that other general components other than the components shown in FIG. 1 may be further included in an image-forming system.

Referring to FIG. 1, the host apparatus 100 includes a user interface unit 110, a driver module 120, a processor 130, and a communication interface unit 140. The host apparatus 100 is an apparatus to control the image forming apparatus 200, and may be any device that may be connected to the image forming apparatus 200 and control the image forming apparatus 200, such as a general purpose computer system and a personal digital assistant (PDA).

The user interface unit 110 obtains an input signal from a user and displays output information to the user. For example, if the host apparatus 100 is a general purpose computer system, the host apparatus 100 includes input/output devices, such as a mouse, a keyboard, a monitor, and a speaker.

A user operates the user interface unit 110 to select a document to be printed and sets up printing options to print the selected document. In a method of setting up a printing option, a user initiates an application, opens a document to be printed by the image forming apparatus 200 via the initiated application, and executes a printer driver of the driver module 120 to perform a printing task. The printer driver may be executed by, for example, clicking a printing icon. When the printer driver is executed, a user interface screen to set up a printing option is displayed on the user interface unit 110.

Figure 2:
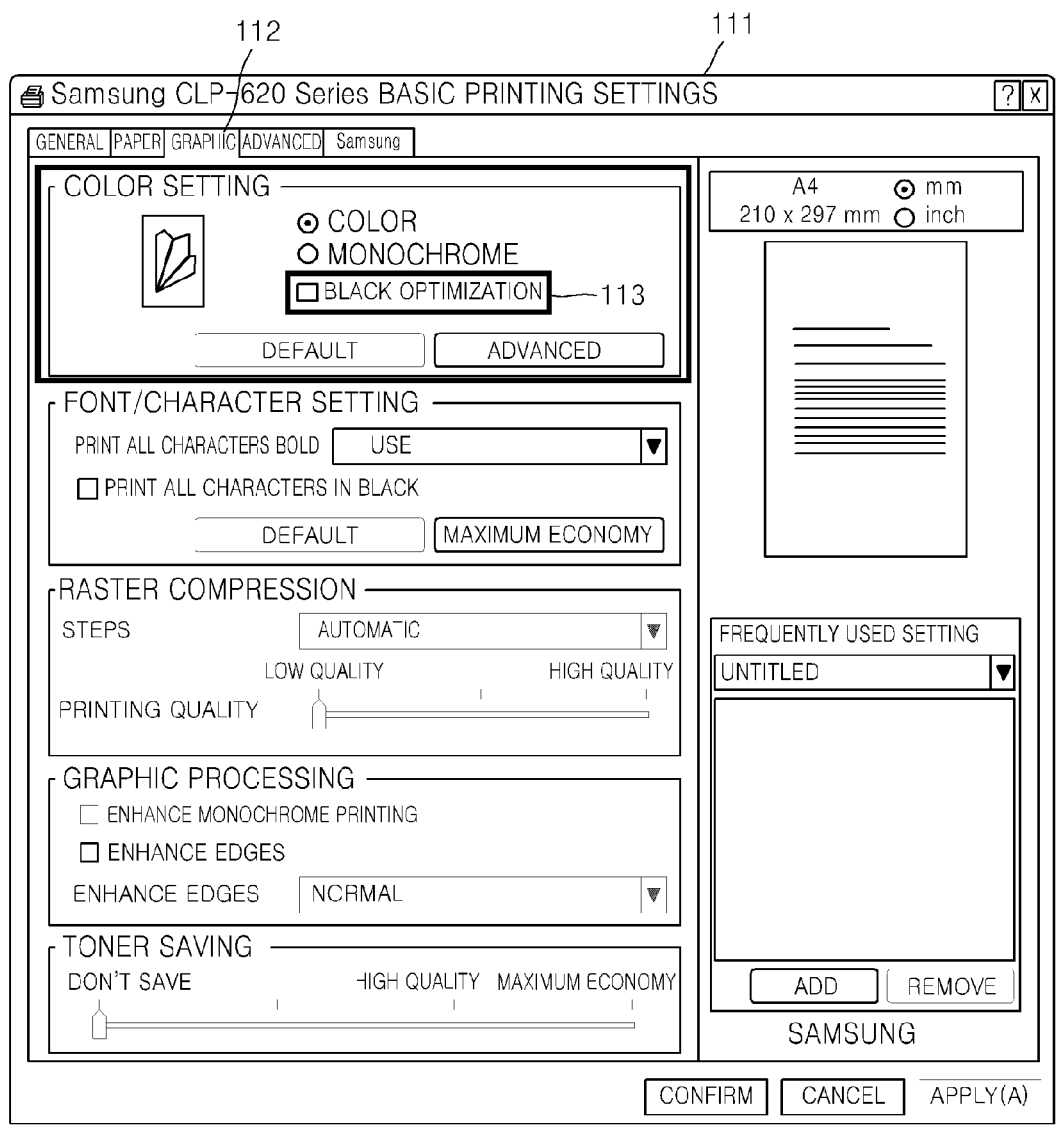
FIG. 2 is a diagram showing a user interface screen to select a printing option according to an embodiment of the present general inventive concept.

FIG. 2 is a diagram showing a user interface screen to select a printing option according to an embodiment of the present general inventive concept. Referring to FIG. 2, a printing option setup screen 111 is displayed on the user interface unit 110 (e.g., the monitor) of the host apparatus 100. The printing option setup screen 111 may be displayed when the printer driver is executed. A user may select to print using normal color settings, a monochrome setting, or a black optimization printing option according to an embodiment of the present general inventive concept. The black optimization setting may be activated, set, or selected by selecting "black optimization" option 113 in "graphic" tab 112, for example.

In the present specification and claims, "monochrome" may refer particularly to black and shades of black (i.e. gray). However, the monochrome color need not be limited to black, and may instead be red, green, blue, cyan, magenta, yellow, or any other desired color.

The printing option setup screen 111 shown in FIG. 2 is merely an example of a user interface to set up a printing option according to an embodiment of the present general inventive concept, and the present general inventive concept is not limited thereto.

In a printing method based on black optimization, a document is printed by using only black color only when red, green, and blue colors in the document are close to a monochrome value. In addition, a level of black color used may be increased as the levels of red, green, and blue approach monochrome color.

The printing option setup screen 111 shown in FIG. 2 illustrates an example of an option setup screen when the monochrome color is black. In other words, when a user selects the "black optimization" option 203, the image forming apparatus 200 prints regions formed of colors close to monochrome values (i.e. black and shades of gray) by using black color only.

The user may conveniently set up a printing option by using the host apparatus 100. In other words, the user may input an instruction to execute the printer driver by using the user interface unit 110, and also may select the black optimization printing option in the user interface displayed in response to executing the printer driver.

The communication interface unit 140 transmits a document to be printed and print data in which the selected black optimization printing option is included to the image forming apparatus 200, and the image forming apparatus 200 prints the document based on the black optimization printing option under control of the host apparatus 100. When the black optimization printing option is selected, the user may efficiently print the document using only a black toner without using other toners. In addition, the user may efficiently print the document using multiple colors, but portions of the document that are monochrome or near monochrome may be printed using only black toner to conserve other toners. Furthermore, since the image forming apparatus 200 may be controlled by using the host apparatus 100, user convenience may be improved.

Referring back to FIG. 1, the driver module 120 includes one or more programs to control the image forming apparatus 200. The driver module 120 may include software stored in a data storage device. The driver module 120 according to an embodiment of the present general inventive concept includes a printer driver, a scan driver, etc. As described above, a printer driver converts a document composed by an application of the host apparatus 100 into print data that may be interpreted by the image forming apparatus 200 to print the document via the image forming apparatus 200. For example, a printer driver includes a graphic device interface (GDI) driver, a postscript driver, a print command language (PCL) driver, and a XML paper specification (XPS) driver.

The printer driver according to an embodiment of the present general inventive concept may further include a web application to control the image forming apparatus 200. The web application may provide a web user interface to control the image forming apparatus 200. The user may select by using the host apparatus 100 a printing option via a web user interface provided by the printer driver of the driver module 120.

The processor 130 controls the image forming apparatus 200 via the host apparatus 100. In other words, the processor 130 executes the printer driver of the driver module 120 and displays the user interface in response to the execution of the printer driver on the user interface unit 110. Furthermore, the processor 130 controls overall functions of the host apparatus 100. The processor 130 may be a processor chip, multiple processor chips, or a combination of one or more processor chips, logic circuits, and memory.

The host apparatus 100 may control the image forming apparatus 200 to perform a printing task based on a black optimization printing option by setting the black optimization printing option and transmitting only the set printing option information to the image forming apparatus 200.

Furthermore, the host apparatus 100 may transmit print data in which the selected optimization printing option is included to the image forming apparatus 200. For example, when a full-color option is selected, the processor 130 of the host apparatus 100 executes the printer driver and may generate or utilize a pre-existing first color matching table to convert document or image data to print data. When a user selects the black-optimization setting, the processor 130 generates a second color matching table based on the existing first color matching table and color properties corresponding to values of red, green, and blue colors of the document to be printed. The processor 130 may then select either a first printing method to print the document by using the first color matching table or a second printing method to print the document by using the second color matching table according to values of red, green, and blue colors in the document.

The communication interface unit 140 transmits the document to be printed and print data of the document including the color matching table corresponding to the selected printing method to the image forming apparatus 200.

Each of the first and second color-matching tables may be stored in either one of the host apparatus 100 and the image-forming apparatus 200. For example, the first color matching table may be stored in the host apparatus 100, whereas the generated second color matching table may be stored in the host apparatus 100. The second color matching table may be used once corresponding to one document, or it may be stored and used repeatedly.

In addition, the operation to generate the second color matching table corresponding to the second printing method and selecting either the first printing method or the second printing method may be performed by the image forming apparatus 200. In other words, either the host apparatus 100 or the image forming apparatus 200 may generate the color matching table corresponding to a second printing method and may select either the first printing method or the second printing method. Then, the image forming apparatus 200 performs a printing task by using the color matching table corresponding to the selected printing method. The method of generating the second color matching table and the method of selecting either the first printing method or the second printing method will be described in relation to the image forming apparatus 200 below in detail.

The communication interface unit 140 transmits and receives data to and from the image forming apparatus 200 via a network. A network according to an embodiment of the present general inventive concept may be a wired network or a wireless network, and the communication interface unit 140 may include one or more wired ports or wireless antennae. Examples of the network include internet, a local area network (LAN), a wireless LAN, and a wide area network (VVAN). However, an embodiment of the present general inventive concept is not limited thereto, and it will be understood by one of ordinary skill in the art that any type of network capable of transmitting and receiving data may be utilized.

Referring to FIG. 1, the image forming apparatus 200 includes a communication interface unit 210, a control unit 220, a storage unit 230, a generating unit 221, a selecting unit 222, a user interface unit 240, an image forming unit 251, a faxing unit 252, and a transmission performing unit 253.

The image forming apparatus 200 is connected to one or more host apparatuses 100 in a wired or wireless manner, and supports one or more functions with respect to a document. The functions include printing, copying, scanning, sending/receiving a fax, sending an e-mail, and sending data to a server.

The communication interface unit 210 receives from the host apparatus 100 via a network one or more pieces of print data, which designates a document to be printed, and print data in which a selected printing option is included. The communication interface unit 210 includes a module to transmit and receive a fax, a network module to be connected to a network, and a USB host module to form a data movement channel with respect to a mobile storage medium.

As described above in relation to the host apparatus 100, the communication interface unit 210 receives one or more pieces of print data and printing option information that are transmitted by the communication interface unit 140 of the host apparatus 100. When print data in which the selected black optimization printing option is included is received from the host apparatus 100, the image forming apparatus 200 prints the document based on the selected black optimization printing option according to an embodiment of the present general inventive concept.

However, printing option information may be either received from the host apparatus 100 or directly input via the user interface unit 240 of the image forming apparatus 200. For example, when the user wants to perform a task such as copying a document, the user may select printing option information by selecting input icons displayed as a graphic user interface (GUI) on a display panel of the user interface 240.

Furthermore, the communication interface unit 210 may receive from the host apparatus 100 print data including a color matching table. In this case, the control unit 220 may perform a printing task according to the selected black optimization printing option based on the received print data in the image forming unit 251.

The control unit 220 controls overall operations of the image forming apparatus 200. In other words, the control unit 220 controls the communication interface unit 210, the storage unit 230, the generating unit 221, the selecting unit 222, the user interface unit 240, an image forming unit 251, the faxing unit 252, and the transmission performing unit 253. Also, the control unit 220 prints print data based on set printing option information. The control unit 220 may include one or more processors, supporting logic chips, and memory.

If the black optimization printing option is activated, the control unit 220 controls the image forming apparatus 200 such that print data to which a color matching table based on the values of red, green, and blue of a document to be printed is applied is printed via the image forming unit 251.

When the black optimization printing option is activated, the control unit 220 sets one or more regions in the document based on how close the values of red, green, and blue colors of a document to be printed are to monochrome values, the generating unit 221 generates a color matching table based on the values of red, green, and blue colors of the document, and the selecting unit 222 selects either a first printing method to print the document by using an existing color matching table or a second printing method to print the document by using the generated color matching table. In this case, the selected first printing method or second printing method may be applied to the entire document, or each of the set one or more regions in the document. Hereinafter, for convenience of explanation, an existing color matching table will be referred as a first color matching table, and a color matching table generated by the generating unit 221 will be referred as a second color matching table.

The values of red, green, and blue colors of a document to be printed will be described below in more detail. Although the most accurate method of embodying colors is using frequency band graphs with respect to all colors, it is not efficient to calculate the frequency band graphs for all colors that are to be successively embodied. Thus, various methods may be used to embody colors, and such methods are referred to as color models. Examples of color models include the RGB (red, green, and blue) model and the CMY (cyan, magenta, and yellow) model.

Figure 3:
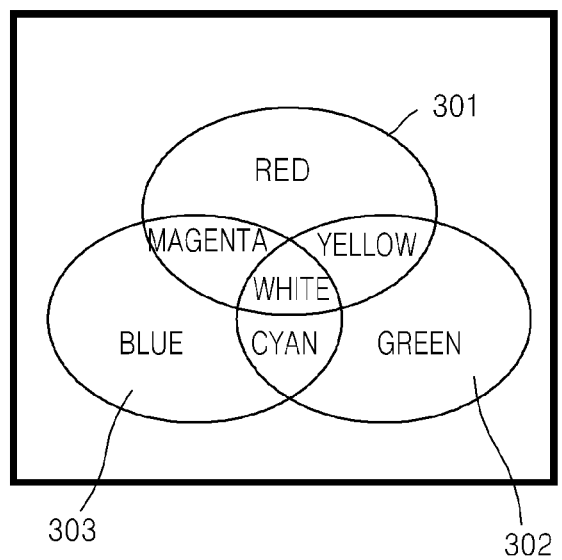
FIG. 3 is a diagram showing an add-combining method of embodying colors by using the RGB color model.

FIG. 3 is a diagram showing an add-combining method of embodying colors by using the RGB color model. The RGB color model embodies colors by using three primary colors. The RGB color model is based on the additive system in which colors becomes brighter as more colors are mixed, and colors are obtained by mixing red 301, green 302, and blue 303.

Figure 4:
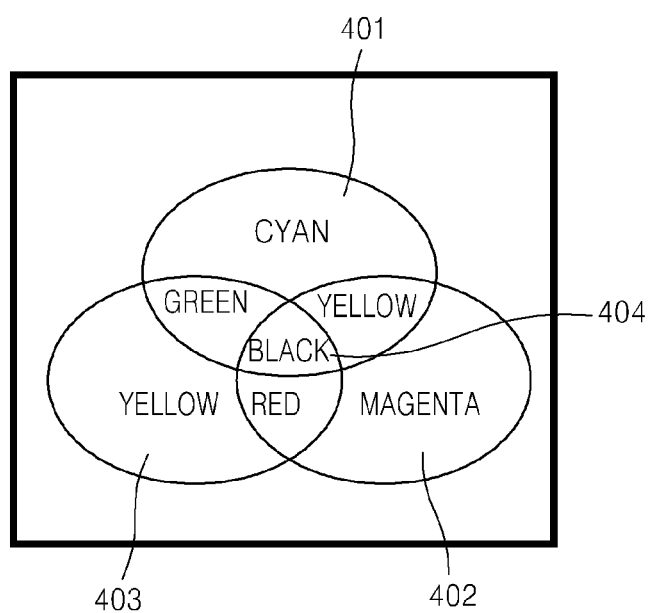
FIG. 4 is a diagram showing a subtract-combining method of embodying colors by using the CMY color model.

FIG. 4 is a diagram showing a subtract-combining method of embodying colors by using the CMY color model. The CMY color model is based on the subtractive system used in many printing devices, and the primary colors of the CMY color model are cyan 401, magenta 402, and yellow 403. The basic colors of the CMY color model, the cyan 401, the magenta 402, and yellow 403, are complementary colors with respect to the red 301, the green 302, and the blue 303 of RGB color model. A printing device embodies colors by using three color toners containing the cyan 401, the magenta 402, and the yellow 403, respectively. However, since pure black cannot be embodied by mixing the cyan 401, the magenta 402, and the yellow 403 in the CMY color model, the CMYK color model, which is the CMY color model to which black (K) 404 is added, is also used.

Referring back to FIG. 1, although the image forming apparatus 200 may perform a printing task by using various color models, it is assumed below for convenience of explanation that a printing task is performed by using the CMYK color model. However, an embodiment of the present general inventive concept is not limited thereto and may also be applied to the case when a printing task is performed by using inks.

If each of values of the R, G, and B colors are represented as 8-bit data in the RGB color model, values of red, green, and blue colors of a document to be printed may be expressed in the form (16, 15, 16) when the value of R color corresponds to 16, the value of G color corresponds to 15, and the value of B color corresponds to 16. In this case, the values of the R, G, and B colors are representing the intensities of red, green, and blue of the document to be printed. Thus, the values of the R, G, and B colors encoded in 24 bits per pixel (bpp) are specified using three 8 bit unsigned integers (e.g., from 0 to 255) representing the intensities of red, green, and blue. Further, color properties of a document to be printed may be decided based on the values of the red, green, and blue colors that are expressed in the above form.

When print data is received from the host apparatus 100, the control unit 220 converts the received print data into image data via an emulation process, and renders the converted image data. Examples of the emulation process according to an embodiment of the present general inventive concept include printer control language (PCL), HP graphic language (HPGL), printer description language (PDL), KS/KSSM, postscript (PS), SML paper specification (XPS), and PCL5CE.

Furthermore, the control unit 220 may convert not only print data received from the host apparatus 100, but also fax data received from a fax apparatus and data received from a movable storage medium connected to the image forming apparatus 200 into image data by using the emulation process. Although the format of image data is generally bitmap, the format of image data is not limited thereto, and examples of the format of image data include joint photographic experts group (JPEG), graphic interchange format (GIF), and portable network graphics (PNG).

The control unit 220 renders converted image data. The term rendering refers to converting colors of each of pixels of the converted image data into print data according to the respective colors.

Furthermore, the control unit 220 sets one or more regions in the document based on how close the values of the red, green, and blue colors of a document are to monochrome values. The one or more regions may include a first region, a second region, and a third region based on how close the values of the red, green, and blue colors of the document are to monochrome values.

The control unit 220 compares the values of the red, green, and blue colors of each pixel of a document to be printed to a predetermined critical value, and determines the color properties of the document according to how close the values of the red, green, and blue colors are to monochrome values. As described above, when the values of the red, green, and blue colors of a pixel are (0, 0, 0), respectively, the color is black. The control unit 220 analyzes the values, compares the result of the analysis to a predetermined critical value, and determines the color properties based on how close the colors of each pixel are to monochrome values.

The predetermined critical value may be set as a ratio from 0% to 100%, or a value from 0 to 255 (in the case of using 8-bit data) may be set based on the channel values of each color. However, the predetermined critical value described above is merely an example. Hereinafter, a method of setting regions based on the predetermined critical value will be described in closer detail.

When a document to be printed includes colors other than black, the printing quality deteriorates if a printing task is performed by using mixed colors throughout the document. In other words, if a text object embodied by using black only and objects embodied by using colors other than black coexist in a document to be printed, a printing task may be performed by using all the colors and by mixing colors in the document. Therefore, a printing task is performed not by using a black toner, but by mixing color toners including cyan, magenta, and yellow for not only objects including colors other than black, but also for text objects embodied by using black or a color close to monochrome values. According to this method, it is necessary to stop and restart an electro-photograph processor engine to perform a monochrome printing method, which is used to print by using black only during a printing task using a mixed color printing method, and thus the printing speed decreases.

Therefore, the image forming apparatus 200 according to an embodiment of the present general inventive concept analyzes values of the red, green, and blue of colors constituting a document and prints regions of which colors are close to monochrome values by using a black toner. Thus, the control unit 220 compares a mixture degree of the red, green, and blue color of each pixel of print data to the predetermined critical value, and sets one or more regions in the document based on a comparison result.

For example, the control unit 220 may divide color levels of a document to be printed into three regions. When the three regions according to an embodiment of the present general inventive concept are referred to as a first region, a second region, and a third region, the first region refers to a region embodied by a color closest to monochrome values, and the third region refers to a region embodied by a color farthest from monochrome values. The boundary between the first region and the second region may be set using a first threshold value, and the boundary between the second region and the third region may be set using a second threshold value.

Figure 5A:
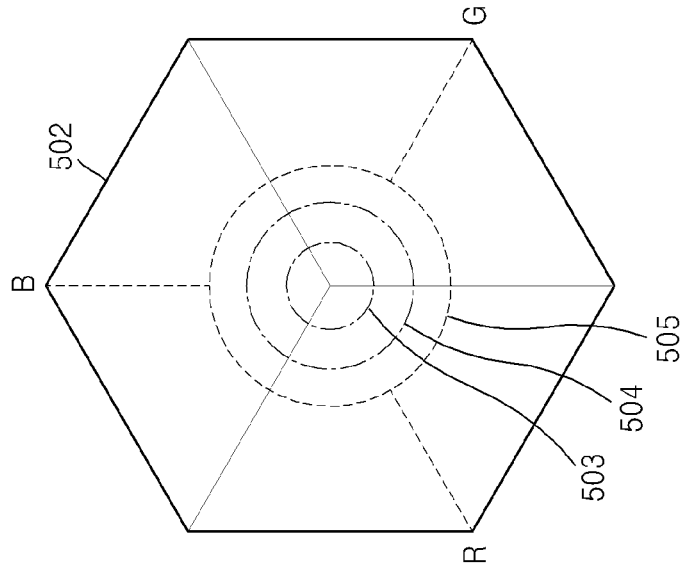
FIG. 5A is a diagram showing a method of setting regions based on a threshold value according to an embodiment of the present general inventive concept.
Figure 5A:
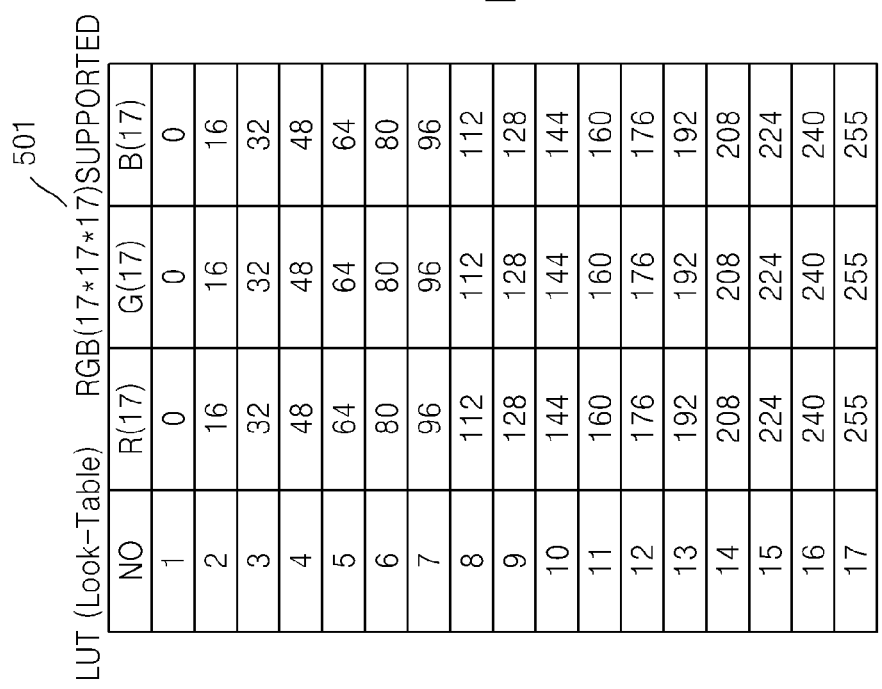

FIG. 5A is a diagram showing a method of setting regions based on a threshold value according to an embodiment of the present general inventive concept. Referring to FIG. 5A, a color table 501 to represent about 4,913 colors and an interest region graph 502 regarding an interest region set based on threshold values are shown.

In case where each value of the R, G, and B colors of a document to be printed is represented as 8-bit data, each of the R, G, and B colors may have a value from 0 to 255, and 16,777,216 colors in total may be represented by combining the R, G, and B colors. The image forming apparatus 200 may use various color tables to represent these colors. Each of the R, G, and B colors may be divided into 9, 17, or 33 regions and each of the values from 0 to 255 may correspond to these regions. The color table 501 represents about 4,913 colors by dividing each of the R, G, and B colors into 18 regions.

The interest region graph 502 shows interest regions set in correspondence to the color table 501. The interest region graph 502 is shown based on the R, G, and B axis. It is assumed that the interest region includes a first region 503, a second region 504, and a third region 505.

According to conditions for using the image forming apparatus 200, colors having values equal-to or less-than the first threshold value may be in the first region 503, and colors having values greater than the first threshold value and equal-to or less-than the second threshold value may be in the second region 504. All other regions except the first region 503 and the second region 504 may correspond to the third region 505, or a size of the third region 505 may be designated by separately setting a third threshold value.

The first threshold value, the second threshold value, and the third threshold value may be set according to conditions for using the image forming apparatus 200. For example, the first threshold value may be set as second section (No. 2) in the color table 501, and the second threshold value may be set as tenth section (No. 10) in the color table 501. For example, a region in which values (R, G, B) are (5, 6, 8) may be in the first region.

Referring back to FIG. 1, the control unit 220 sets the first and second threshold levels to define the first, second, and third regions.

The first through third regions and the first and second threshold values described above are merely examples according to an embodiment of the present general inventive concept, and the number of regions and threshold values are not limited to the above description.

The generating unit 221 may generate a second color matching table by using an existing first color matching table and color properties corresponding to values of the red, green, and blue colors of the document. In other words, the control unit 220 sets one or more regions in the document, and the generating unit 221 generates a color matching table corresponding to the set regions. The generating unit 221 may be part of the control unit 220 and may include software executed by the control unit 220 to generate the second color-matching table.

In an embodiment of the present general inventive concept, the term "color matching table" refers to a table including corresponding relationships among composition ratios of primary colors and black in order to represent a color with respect to a plurality of the primary colors and black corresponding to toners of the image forming apparatus 200. In other words, a color matching table in the image forming apparatus 200 according to an embodiment of the present general inventive concept refers to a table including corresponding relationships among composition ratios of cyan, magenta, yellow, and black to represent a color by mixing cyan, magenta, yellow, and black. However, the color matching table may include other various colors. A color matching table according to an embodiment of the present general inventive concept may be stored in the storage unit 230 as a lookup table, for example. Alternatively, the color-matching table may be stored in the host apparatus 100.

The generating unit 221 generates a second color matching table corresponding to the set regions by using the first color matching table stored in the storage unit 230. In other words, the generating unit 221 generates the second color matching table by multiplying a first color matching table by a weight corresponding to color properties of the document.

The second color matching table may be formed of color matching tables respectively corresponding to set regions. In other words, the second color matching table may include a color matching table corresponding to the first region, a color matching table corresponding to the second region, and a color matching table corresponding to the third region.

The color properties are relative printing values with respect to cyan, magenta, yellow, and black in regions set based on how close the values of red, green, and blue colors are to monochrome values, and the relative printing values are weighted values based on the values of red, green, and blue of the document which are closer to monochrome values. The relative printing values comprises a first value and a second value. In this case, the first value is a weight value assigned to color values with respect to cyan, magenta, and yellow values, and the second value is a weight value assigned to black value. In other words, the relative printing values may be determined such that the second value increases and the first value decrease as values of the red, green, and blue colors of a document are closer to monochrome values.

For example, a document to be printed according to an embodiment of the present general inventive concept may include a first region containing colors closest to monochrome values and second and third regions containing colors other than black. In this case, colors of the second region are closer to monochrome values than colors of the third region.

Since the first region contains colors which value is the closest to monochrome values, the generating unit 221 generates a second color matching table with respect to the first region by setting a first value to 100% and also setting a second value to 0% with respect to a first color matching table.

In particular, a first color matching table indicates mixture ratio with respect to each of cyan, magenta, yellow, and black. The generating unit 221 generates a second color matching table by multiplying mixture ratio in the first color matching table by the relative printing values. In other words, the generating unit 221 generates the second color matching table by multiplying the first value by values of colors with respect to mixture ratio of cyan, magenta, and yellow of the first color matching table and multiplying the second value by value of black.

The generating unit 221 may generate the second color matching table with respect to the second region by setting a second value to 70% and setting a first value to 40%, and may also generate the second color matching table with respect to the third region by setting a second value to 30% and setting a first value to 80%. The relative printing values may be changed by a user or according to setting of the image forming apparatus 200. Thus, the first value and the second value may be changeable.

FIGS. 5B-5D illustrate methods of determining whether a color of a first color-matching table exceeds a predetermined threshold and generating a second color-matching table.

In FIG. 5B, the closeness of a CMYK color to a monochromatic color is determined by averaging the CMY values of the color from the first color-matching table 511. For example, if the host apparatus 100 determines that pixel no. 1 of a document has CMY values of 8, 0, and 12, respectively, the host apparatus 100 may calculate an average CMY value of 5. If the first threshold value is 16, corresponding to the interval No. 2 of color table 501, then the pixel no. 1 of the first color-matching table 511 falls into the first region. If the first weight value of the first region is set at 0% and the second weight value is set at 100%, then the values corresponding to the colors CMY are all 0 in the second color-matching table 521, and the value corresponding to black, K, is 10.

Likewise, if a second threshold level is set at 112 to correspond to interval No. 8 of the color table 501, then the host apparatus 100 may determine whether a pixel value falls into the second region if an average CMY value is less-than or equal-to 112. Since the average CMY values of pixels 2, 3, and 4 of the first color-matching table 511 are all between 16 and 112, each of the pixels 2, 3, and 4 would correspond to the second region. If the first weight value of the second region is set at 40% and the second weight value is set at 70%, then the values corresponding to the colors CMY may all be multiplied by 0.4 in the second color-matching table 521, and the value corresponding to black, K, may be multiplied by 0.7.

Since pixels 4 and 5 have average CMY values above the second threshold level, 112, the host apparatus 100 may determine that pixels 4 and 5 are located in the third region. If the first weight value of the third region is set at 80% and the second weight value is set at 30%, then the values corresponding to the colors CMY may all be multiplied by 0.8 in the second color-matching table 521, and the value corresponding to black, K, may be multiplied by 0.3.

FIG. 5C is similar to FIG. 5B, except the closeness of the CMYK pixel to a monochrome color, black, is determined by the highest CMY value each pixel, rather than by an average CMY value. In other words, the host apparatus 100 may determine which of the values corresponding to the colors cyan, magenta, and yellow, respectively, is the highest. The host apparatus 100 may compare the highest CMY value with the threshold values to determine a region of the pixel and to generate the second color-matching table 531.

FIG. 5D is similar to FIG. 5B, except the closeness of the CMYK pixel to a monochrome color, black, is determined by the highest CMY value each pixel minus the K value, rather than by an average CMY value. In other words, the host apparatus 100 may determine which of the values corresponding to the colors cyan, magenta, and yellow, respectively, is the highest. The host apparatus 100 may then subtract from the highest value the K value of the pixel and compare the result with the threshold values to determine a region of the pixel and to generate the second color-matching table 541.

Although examples of methods of generating second color-matching tables have been illustrated above, any appropriate method may be used, including any combination of the above methods. In addition, while the example embodiments of FIGS. 5B-5D illustrate analyzing individual pixels, the host apparatus 100 or image-forming apparatus 200 may average or combine any number of pixels to determine whether a portion of a document or the whole document is located within a predetermined region. For example, if the host apparatus 100 generates the second color-matching table, the host apparatus 100 may analyze the document to determine portions having similar color characteristics and may calculate the second color-matching table corresponding to each of the portions of the document, instead of generating the second color-matching table for each pixel, as illustrated in FIGS. 5B-5D.

Figure 9A:
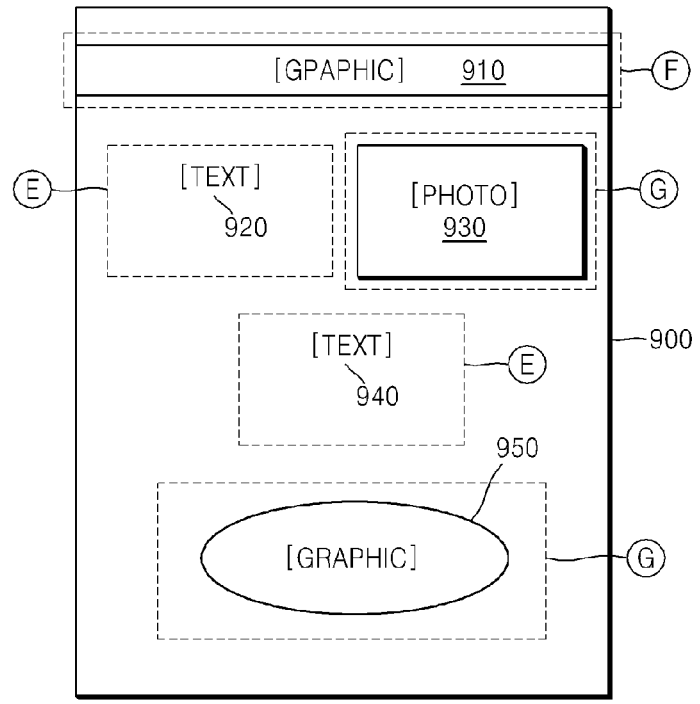
FIGS. 9A and 9B illustrate regions of a document according to an embodiment of the present general inventive concept.
Figure 9B:
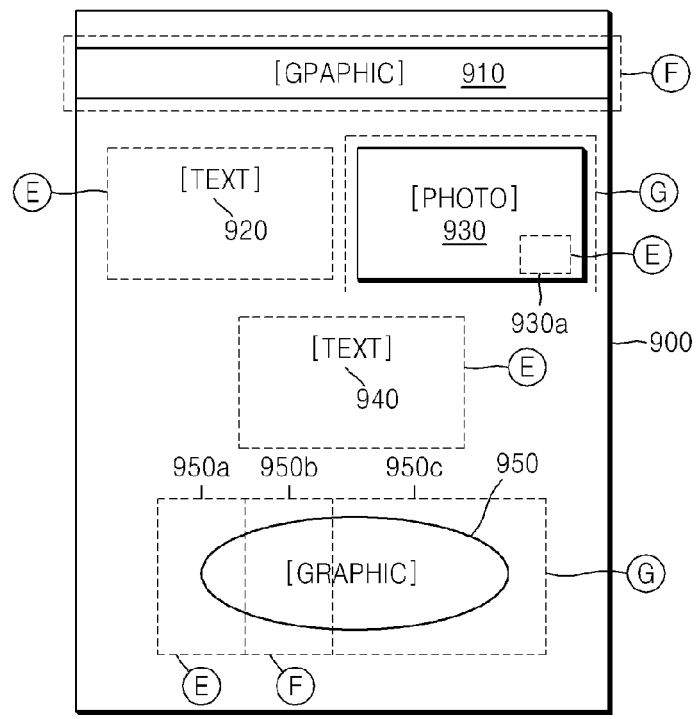

FIGS. 9A and 9B illustrate analyzing a document to generate second color-matching tables for different parts of the document. As illustrated in FIG. 9A, a host apparatus 100 or image-forming apparatus 200 may analyze a document to identify similar elements. For example, in FIG. 9A, the graphic 910, text 920, photo 930, text 940, and graphic 950 are identified as separate elements. The host 100 or image-forming apparatus 200 may analyze each element to determine whether the element corresponds to the first region, as indicated by the reference identifier E, the second region, as indicated by the reference identifier F, or the third region, as indicated by the reference identifier G. In FIG. 9A, text 920 and 940 are identified as being in the first region E, or the closest colors to a monochromatic color, graphic 910 is identified as being in the second region F, and photo 930 and graphic 950 are identified as being in the third region G.

Consequently, the host apparatus 100 or image-forming apparatus 200 may generate second color-matching tables to correspond the elements of the document that in turn correspond to each of the first, second, and third regions. In other words, the host apparatus 100 or image-forming apparatus 200 may generate a second color-matching table corresponding to region 1 and may use the table to form an image corresponding to the text 920 and 940. Another second color matching table may be generated to form images of the graphic 910, and yet another second color matching table may be generated to form images of the photo 930 and the graphic 950.

In FIG. 9B, the host apparatus 100 or the image-forming apparatus 200 may analyze the document 900 to determine which portions of the document have similar color characteristics, and may generate different second color-matching tables accordingly. For example, the host apparatus 100 or image-forming apparatus 200 may determine that the photo 930 includes a monochrome portion 930a and may associate the monochrome portion 930a with the first region E. Likewise, it may be determined that the graphic 950 includes a monochrome portion 950a corresponding to the first region E, an intermediate portion 950b corresponding to the second region F, and a high-color portion 950c corresponding to the third region G. The host apparatus 100 or image-forming apparatus 200 may then associate each portion of the document 900 with a corresponding second color-matching table.

In other words, the host apparatus 100 or image-forming apparatus 200 may generate a second color-matching table corresponding to the first region E to print the text 920 and 940, the portion 930a of the photo 930, and the portion 950a of the graphic 950. The host apparatus 100 or image-forming apparatus 200 may generate another second color-matching table to correspond to the second region to print the graphic 910, and the portion 950b of the graphic 950. The host apparatus 100 or image-forming apparatus 200 may generate another second color-matching table to correspond to the third region to print the remaining elements of the document.

As described above with respect to the second region and the third region, formation of boundaries between a first region, which is printed by using black only, and second and third regions may be prevented by setting weights for black and cyan, magenta, and yellow. Furthermore, color-monochrome reversing may also be prevented.

The relative printing values suggested above are mere examples and are not limited thereto. The second color matching table may be generated by using various methods.

The control unit 220 stores the generated second color matching table in the storage unit 230. A second color matching table may be either permanently stored for repetitive application or temporarily stored for one-time application, based on printing options. Furthermore, the user may update the stored second color matching table.

Furthermore, the control unit 220 may store the second color matching table in the host apparatus 100 connected to the image forming apparatus 200 or in a storage medium connected to the image forming apparatus 200. The storage medium includes any medium capable of storing data, and the control unit 200 may also store the second color matching table in a mobile storage medium connected to the image forming apparatus 200 or the host apparatus 100. The host apparatus 100 may include a data storage device (not shown) such as a memory chip, for example, to store the second color matching table.

Accordingly, the user may perform printing tasks in same printing method as described above via other image forming apparatuses by using the stored second color matching table.

The selecting unit 222 selects either a first printing method to print a document to be printed by using the first color matching table or a second printing method to print the document by using the second color matching table based on color properties of the document. In other words, when the black optimization printing option is activated, the selecting unit 222 selects either the first printing method or the second printing method based on how close the values of red, green, and blue of the document are to monochrome values. Furthermore, when the second printing method is selected, the selecting unit 222 may select color matching tables corresponding to each of set regions based on how close the values of red, green, and blue are to monochrome values. The selecting unit 222 may include a program executed by the control unit 220 and the selecting unit 222 may include one or more processors, logic circuits, and memory to perform the selection operation.

In the first printing method according to an embodiment of the present general inventive concept, a document is printed by using the first color matching table existing in the image forming apparatus 200. The first color matching table is a color matching table that is stored in the image forming apparatus 200 in advance and set as the default color matching table. In other words, when the black optimization printing option is not set, a printing task is performed by using the first color matching table according to a general printing procedure. Furthermore, even if the black optimization printing option is activated, a printing task is performed by using the first color matching table with respect to regions set to be printed by using a first printing method.

In the second printing method, a document is printed by using the second color matching table. The image forming apparatus 200 sets a plurality of regions in the document to be printed based on the values of red, green, and blue in the document, selects the second color matching table corresponding to each of the set regions, and prints the document.

If the document to be printed includes one or more objects such as a photo object, a text object, and a graphic object, a printing task may be performed by selecting either the first printing method or the second printing method with respect to not only the entire document, but also individual objects. Furthermore, if the document includes one or more pages, a printing task may be performed by selecting either the first printing method or the second printing method with respect to individual pages.

The selecting unit 222 may either perform a printing task by selecting the second printing method with respect to the entire document or individual objects based on the values of red, green, and blue of the document or perform a printing task by selecting either the first printing method or the second printing method with respect to the entire document or individual objects based on the values of red, green, and blue in the document.

The control unit 220 performs a color matching operation with respect to each region of the document to be printed by using the first color matching table or the second color matching table. The second color matching table may be a color matching table which is generated in advance and stored in the storage unit 230, the host apparatus 100, or a storage medium, and read out. Furthermore, the control unit 220 may perform color matching operations with respect to individual objects during the color matching operation by using color matching tables corresponding to each region in the document to be printed.

After the color matching operation is completed, the control unit 220 performs a half-tone operation. The control unit 220 outputs data on which the half-tone operation is performed to the image forming unit 251 and the document to be printed is printed. In the half-tone operation, the control unit 220 improves a seamless appearance of a formed image by controlling a size or spacing of image elements, such as dots or pixels, between, around, or within existing image elements. For example, the control unit 220 may improve a shading of a portion of the image by varying an image element size from a darker portion of the shading in the image to a lighter portion of the shade in the image.

The control unit 220 obtains RGB images via the communication interface unit 210. A data process in the control unit 220 based on selection of the black optimization printing option is shown in FIG. 6.

Figure 6:
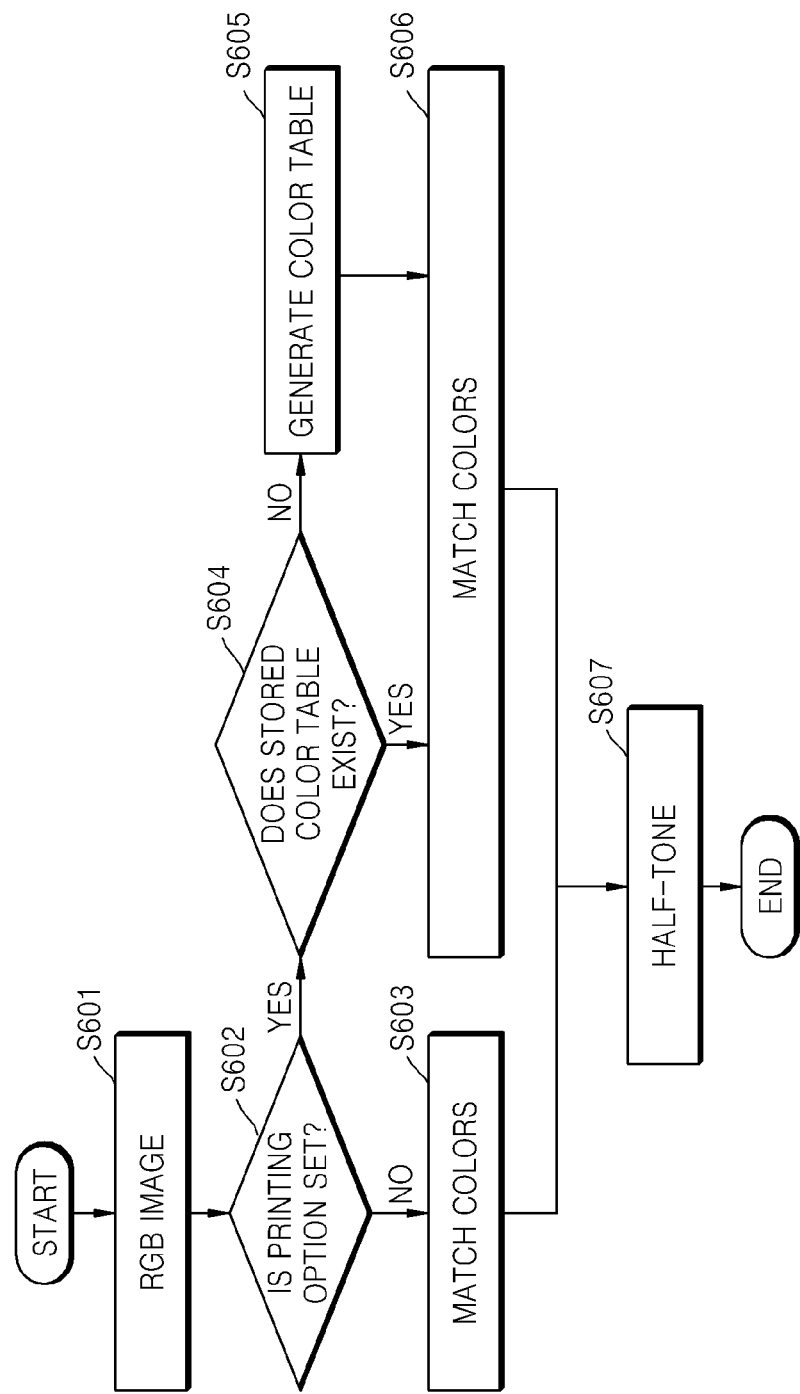
FIG. 6 is a flowchart of a data process performed by a control unit based on selection of the black optimization printing option according to an embodiment of the present general inventive concept.

FIG. 6 is a flowchart of a data process performed by the control unit 220 based on selection of the black optimization printing option according to an embodiment of the present general inventive concept. Referring to FIG. 6, the flowchart of the data process performed by the control unit 220 according to an embodiment of the present general inventive concept includes operations that are time-sequentially processed in the image forming apparatus 200 shown in FIG. 1. Thus, all previous descriptions in relation to the image forming apparatus 200 shown in FIG. 1 also apply to the flowchart of FIG. 6.

In operation S601, the control unit 220 obtains RGB images of a document to be printed.

In operation S602, the control unit 220 determines whether the black optimization printing option according to an embodiment of the present general inventive concept is executed. If the black optimization printing option is activated, the operation proceeds to operation S604. If the black optimization printing option is not activated, the data process proceeds to operation S603.

In the operation S603, the control unit 220 performs a color matching operation with respect to the document to be printed by using the first color matching table stored in the storage unit 230.

In the operation S604, if the black optimization printing option is activated, the control unit 220 determines whether a stored color matching table exists. The stored color matching table may be stored in one or more of the storage unit 230, the host apparatus 100 connected to the image forming apparatus 200, and a storage medium connected to the image forming apparatus 200. If it is determined that the stored color matching table exists, the data process proceeds to operation S606. If it is determined that a stored color matching table does not exist, the data process proceeds to operation S605.

In the operation S605, the generating unit 221 generates the second color matching table by using color properties corresponding to values of red, green, and blue of the document.

In the operation S606, the control unit 220 performs a color matching operation by using either the stored color matching table or the generated second color matching table.

In operation S607, the control unit 220 performs a halftone operation, and then the document to be printed is converted to CMYK images.

Figure 7A:
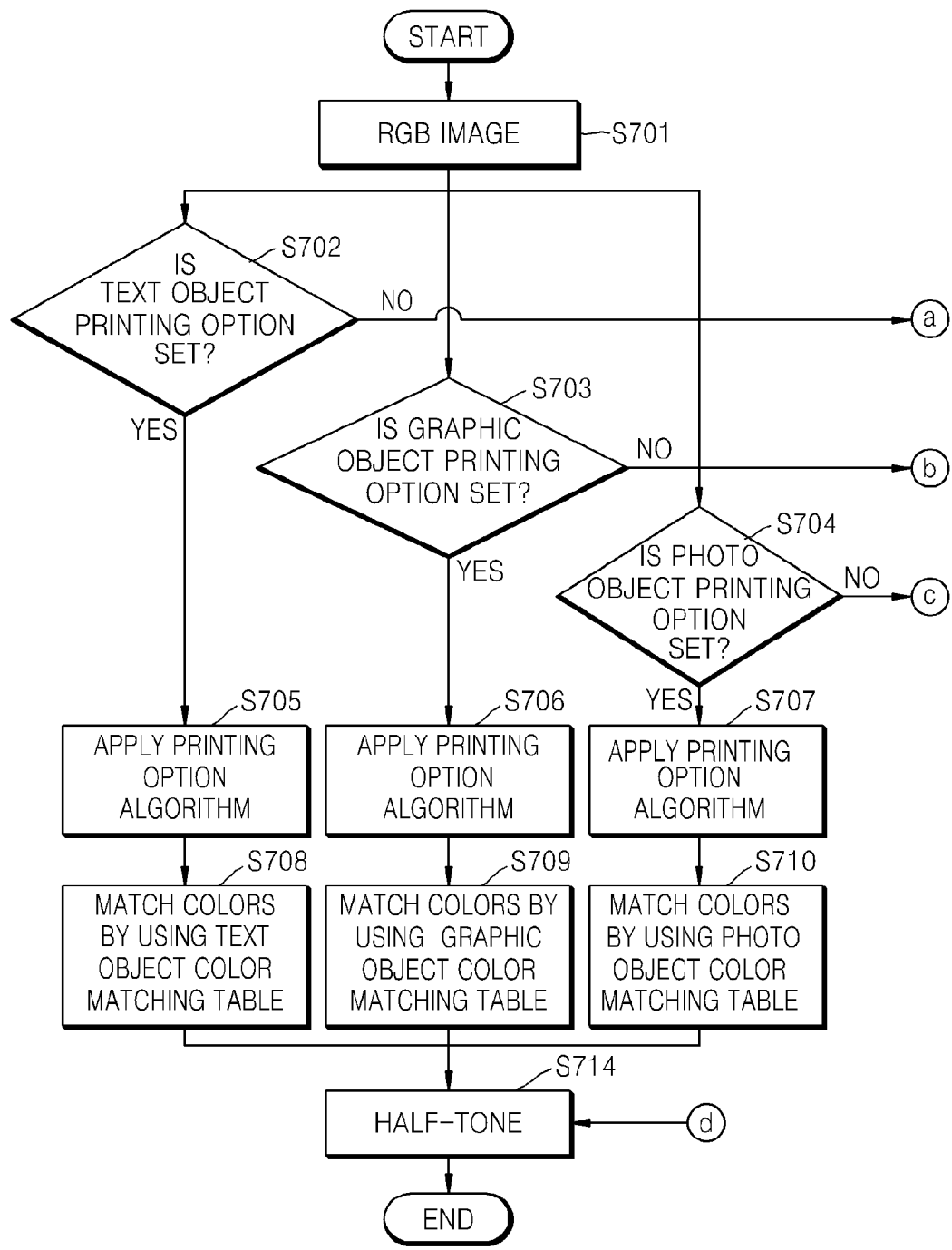
FIGS. 7A and 7B are flowcharts of data process for an individual object based on selection of the black optimization printing option according to an embodiment of the present general inventive concept.
Figure 7B:
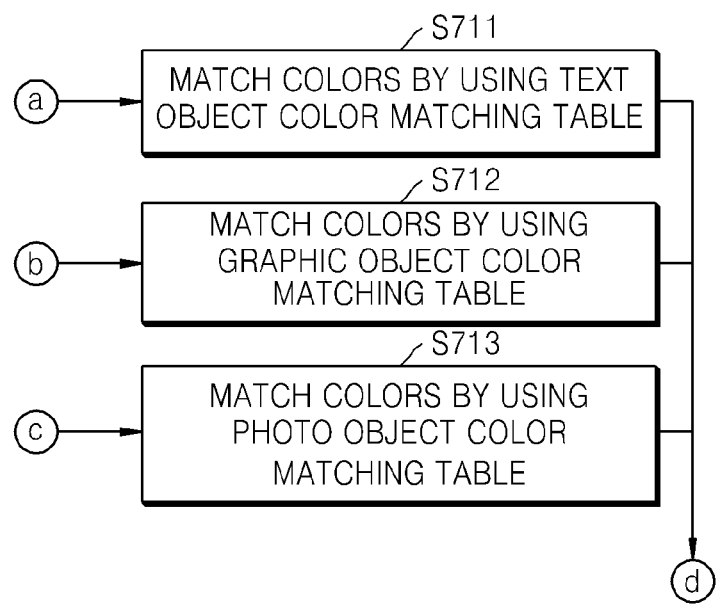

FIGS. 7A and 7B are flowcharts of data process for an individual object based on selection of the black optimization printing option according to an embodiment of the present general inventive concept. Referring to FIGS. 7A and 7B, the flowchart of the data process performed by the control unit 220 according to an embodiment of the present general inventive concept includes operations that are time-sequentially processed in the image forming apparatus 200 shown in FIG. 1. Thus, all previous descriptions in relation to the image forming apparatus 200 shown in FIG. 1 also apply to the flowchart of FIGS. 7A and 7B.

In operation S701, the control unit 220 obtains RGB images of the document to be printed.

In operations S702 through S704, the control unit 220 determines whether the black optimization printing option according to an embodiment of the present general inventive concept is executed with respect to individual objects. If it is determined that the black optimization printing option is executed, the data process proceeds to operations S705 through S707, respectively. If it is determined that the black optimization printing option is not executed, the data process proceeds to operations S711 through S713, respectively.

In the operations S705 through S707, the control unit 220 performs an algorithm according to options to print a document based on color properties according to an embodiment of the present general inventive concept with respect to individual objects. The algorithm refers to the operations S604 and S605 shown in FIG. 6. In other words, the algorithm refers to an operation of determining whether a stored color matching table exists or not and either reading out the stored color matching table or generating the second color matching table. The generating unit 221 reads out the first color matching table stored in the storage medium 230 and uses the first color matching table to generate the second color matching table.

In operations S708 through S710, the control unit 220 performs a color matching operation with respect to individual objects.

In operations S711 through S713, the control unit 220 performs color matching operation by using the first color matching table stored in the storage unit 230.

In operation S714, the control unit 220 performs a halftone operation, and then a document to be printed is converted to CMYK images.

Thus, the image forming apparatus 200 according to an embodiment of the present general inventive concept may determine whether the black optimization printing option is executed or not and print with respect to individual objects. A user may set printing options to individual objects, or printing options may be set to individual objects according to default setting of the image forming apparatus 200.

Referring back to FIG. 1, a color matching table which includes mixture ratios of colors to print a document and print data of a document to be printed may be stored in the storage unit 230. Furthermore, the storage unit 230 may store a new color matching table generated by the generating unit 221. The storage unit 230 according to an embodiment of the present general inventive concept is a general storage unit, and it will be understood by one of ordinary skills in the art that examples of the storage unit 230 include a hard disk drive (HDD), a random access memory (RAM), a flash memory, and a memory card.

The user interface unit 240 obtains a signal input by the user, and displays output information to the user. For example, the user interface unit 240 may be an input/output device, such as a display panel, a mouse, a keyboard, a touch panel, a monitor, and a speaker, that is prepared in the image forming apparatus 200, The user may activate the black optimization printing option or confirm printing option setting by using the user interface unit 240.

The image forming unit 251 performs image formation with respect to a document to be printed obtained from the control unit 220. In other words, according to control of the control unit 220, the image forming unit 251 performs a printing task with respect to the document to be printed based on selection of printing options according to an embodiment of the present general inventive concept with respect to the entire document, individual pages, or individual objects of the document to be printed. In other words, according to a result of selecting the first printing method or the second printing method by the selecting unit 222, print data is printed by applying the first color matching table or the second color matching table to the entire document or individual objects of the document. A printing task may be performed by either applying the stored second color matching table one time and then deleting or discarding the second color matching table or an data address of the second color matching table, or the stored second color matching table may be used repeatedly in subsequent printing operations.

The faxing unit 252 and the transmission performing unit 253 perform various functions of the image forming apparatus 200. The faxing unit 252 performs transmission of a document via fax, and the transmission performing unit 253 may perform functions for transmitting a document to an external device, such as a server, a mobile storage medium, and a computer system.

Figure 8:
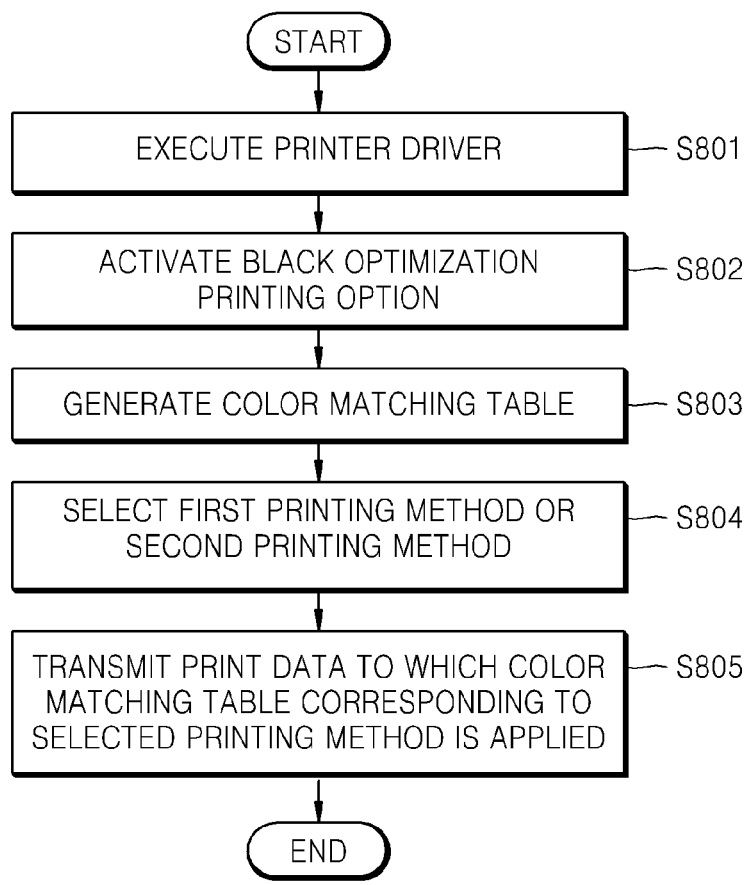
FIG. 8 is a flowchart of a method of controlling an image forming apparatus which supports the black optimization printing option according to an embodiment of the present general inventive concept

FIG. 8 is a flowchart of a method of controlling the image forming apparatus 200 which supports the black optimization printing option according to an embodiment of the present general inventive concept. Referring to FIG. 8, the flowchart of the method of controlling the image forming apparatus 200 includes operations that are time-sequentially processed in the image forming apparatus 200 shown in FIG. 1. Thus, all previous descriptions in relation to the image forming apparatus 200 shown in FIG. 1 also apply to the flowchart of FIG. 8.

In operation S801, the processor 130 of the host apparatus 100 executes a printer driver to print a document.

In operation S802, a user selects the black optimization printing option via the user interface unit 110, and the black optimization printing option is executed in the printer driver in correspondence to the selection.

In operation S803, the processor 130 generates the second color matching table by using the existing first color matching table and color properties corresponding to values of red, green, and blue of the document based on the black optimization printing option set by using the executed printer driver.

In operation S804, the processor 130 selects the first printing method to print the document by using the first color matching table or the second printing method to print the document by using the second color matching table according to values of red, green, and blue of the document by using the executed printer driver.

In operation S805, the communication interface unit 140 transmits print data to which a color matching table corresponding to the printing method selected by using the executed printer driver is applied to the image forming apparatus 200.

Thus, regions may be set based on how close the values of colors of the document are to monochrome values, a color matching table corresponding to the set region may be generated, a printing method corresponding to the set region may be selected, and a color matching table corresponding to the selected printing method may be used. Further, the printing method described above may be controlled by using not only the image forming apparatus 200, but also the host apparatus 100.

As described above, the image forming apparatus 200 may perform a printing task with a black toner only with respect to regions of which color values are close to monochrome values by using the black optimization printing option. Thus, if a document partially includes colors other than black, only regions of the document having colors other than black may be printed by using mixed colors and regions having colors close to monochrome values may be printed by black only. Thus, printing quality may be improved, and problems such as partially printed texts and unnecessary use of mixed colors caused by printing black color by using mixed colors may be resolved. Further, the cost of printing task can save by preventing unnecessary use of mixed color toners, and the accurate charging is possible when the cost is charged based on toner consumption.

The embodiments of the present general inventive concept can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs).

While present general inventive concept has been particularly shown and described with reference to exemplary embodiments thereof, it will be understood by those skilled in the art that various changes in form and details may be made therein without departing from the spirit and scope of the present general inventive concept as defined by the appended claims. The exemplary embodiments should be considered in descriptive sense only and not for purposes of limitation. Therefore, the scope of the present general inventive concept is defined not by the detailed description of the present general inventive concept but by the appended claims, and all differences within the scope will be construed as being included in the present general inventive concept.

What is claimed is:

1. A method of forming an image, the method comprising:
generating a second color-matching table corresponding to a first color-matching table, the values of the second color-matching table based on values of a plurality of colors in a document and the values of the first color-matching table corresponding to predetermined levels of the colors divided into a predetermined number of intervals, each interval corresponding to an intensity of each color, respectively; and
printing the document using the second color-matching table when the colors in the document are below a predetermined threshold,
wherein the generating of the second color-matching table includes assigning a weight to each of the values of the first color-matching table to correspond to the intensity of each color in the document, such that the values of the second color-matching table are the weighted values of the first color-matching table.

2. The method according to claim 1, wherein the predetermined threshold
includes a plurality of thresholds, and
generating the second color-matching table further comprises:
dividing the second color-matching table into a plurality of regions defined by the plurality of thresholds, respectively, the values of each region corresponding to a different weight than the values of each other region.

3. The method according to claim 1, wherein the weight includes a first
weight value and a second weight value,
the first weight value corresponds to a percentage applied to the values of the non-monochrome colors of the first color-matching table to generate the corresponding values of the colors of the second color-matching table; and
the second weight value corresponds to a percentage applied to a value of the monochrome color of the first color-matching table to generate a monochrome color value of the second color-matching table.

4. The method according to claim 3, wherein:
the first weight value decreases as the values of the colors of the first color-matching table decrease; and
the second weight value increases as the values of the colors of the first color-matching table decrease.

5. The method according to claim 3, wherein the value of the at least one of the colors of the first color-matching table used to generate a monochrome color value of the second color-matching table includes an average of the values detected in the document of each color of the first color-matching table.

6. The method according to claim 3, wherein the monochrome color is black.

7. The method according to claim 1 wherein the first color-matching table includes values of the colors red, green, and blue.

8. The method according to claim 1 wherein the first color-matching table includes values of the colors cyan, magenta, yellow, and black.

9. The method according to claim 1, further comprising:
determining color intensities of a plurality of regions of the document; and
printing each respective region of the document using the second color-matching table only when the colors in the respective region are below the predetermined threshold.

10. The method according to claim 9 further comprising:
printing each respective region of the document using the first color-matching table only when the colors in the respective region are equal to or greater than the predetermined threshold.

11. A method of performing monochrome color optimization, the method comprising:
receiving an input to perform a monochrome-color optimization function on a document;
generating a second color-matching table corresponding to a first color-matching table, the values of the second color-matching table based on values of a plurality of colors in the document and the values of the first color-matching table corresponding to predetermined levels of the colors divided into a predetermined number of intervals, each interval corresponding to an intensity of each color, respectively;
determining whether the levels of the colors in the document exceed a predetermined threshold; and transmitting the second color-matching table with print data of the document only when the colors in the document do not exceed the predetermined threshold, and transmitting the first color-matching table with the print data of the document only when the colors in the document exceed the predetermined threshold, wherein the generating of the second color-matching table includes assigning a weight to each of the values of the first color-matching table to correspond to the intensity of each color in the document, such that the values of the second color-matching table are the weighted values of the first color-matching table.

12. A method of printing an image, the method comprising:

generating a second color-matching table corresponding to a first color-matching table, the values of the second color-matching table based on values of a plurality of colors in a document and the values of the first color-matching table corresponding to predetermined levels of the colors divided into a predetermined number of intervals, each interval corresponding to an intensity of each color, respectively;

determining whether the levels of the colors in the document exceed a predetermined threshold; and printing the document using the second color-matching table only when the colors in the document do not exceed the predetermined threshold, and printing the document using the first color-matching table only when the colors in the document exceed the predetermined threshold, wherein the generating of the second color-matching table includes assigning a weight to each of the values of the first color-matching table to correspond to the intensity of each color in the document, such that the values of the second color-matching table are the weighted values of the first color-matching table.

* * * * *